Oct. 20, 1936.  E. G. CARROLL  2,057,707
BRAKE
Filed May 23, 1932  3 Sheets-Sheet 1

INVENTOR.
EUGENE G. CARROLL
BY Jerome R. Cox
ATTORNEY

Oct. 20, 1936.  E. G. CARROLL  2,057,707
BRAKE
Filed May 23, 1932  3 Sheets-Sheet 2
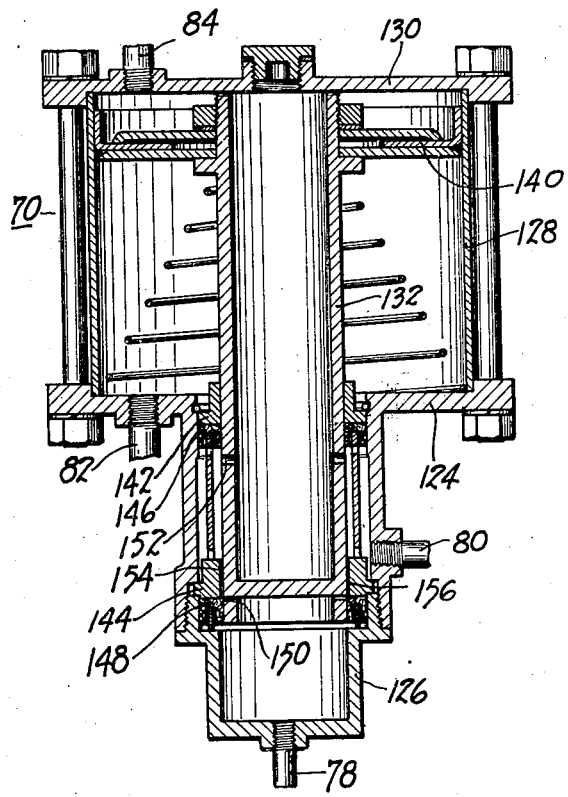
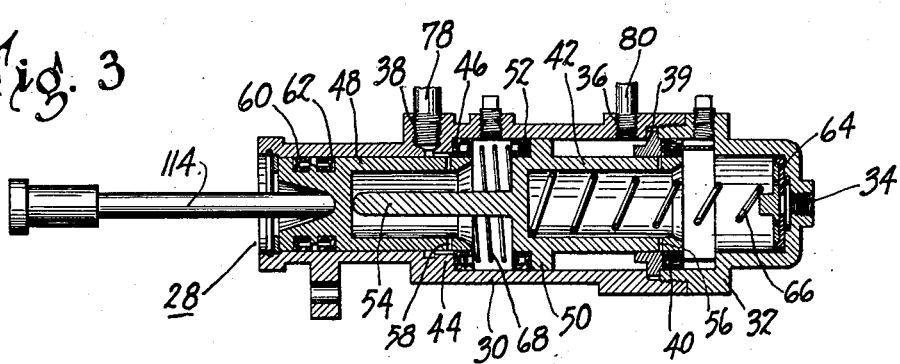
INVENTOR.
EUGENE G. CARROLL
BY Jerome R. Cox
ATTORNEY

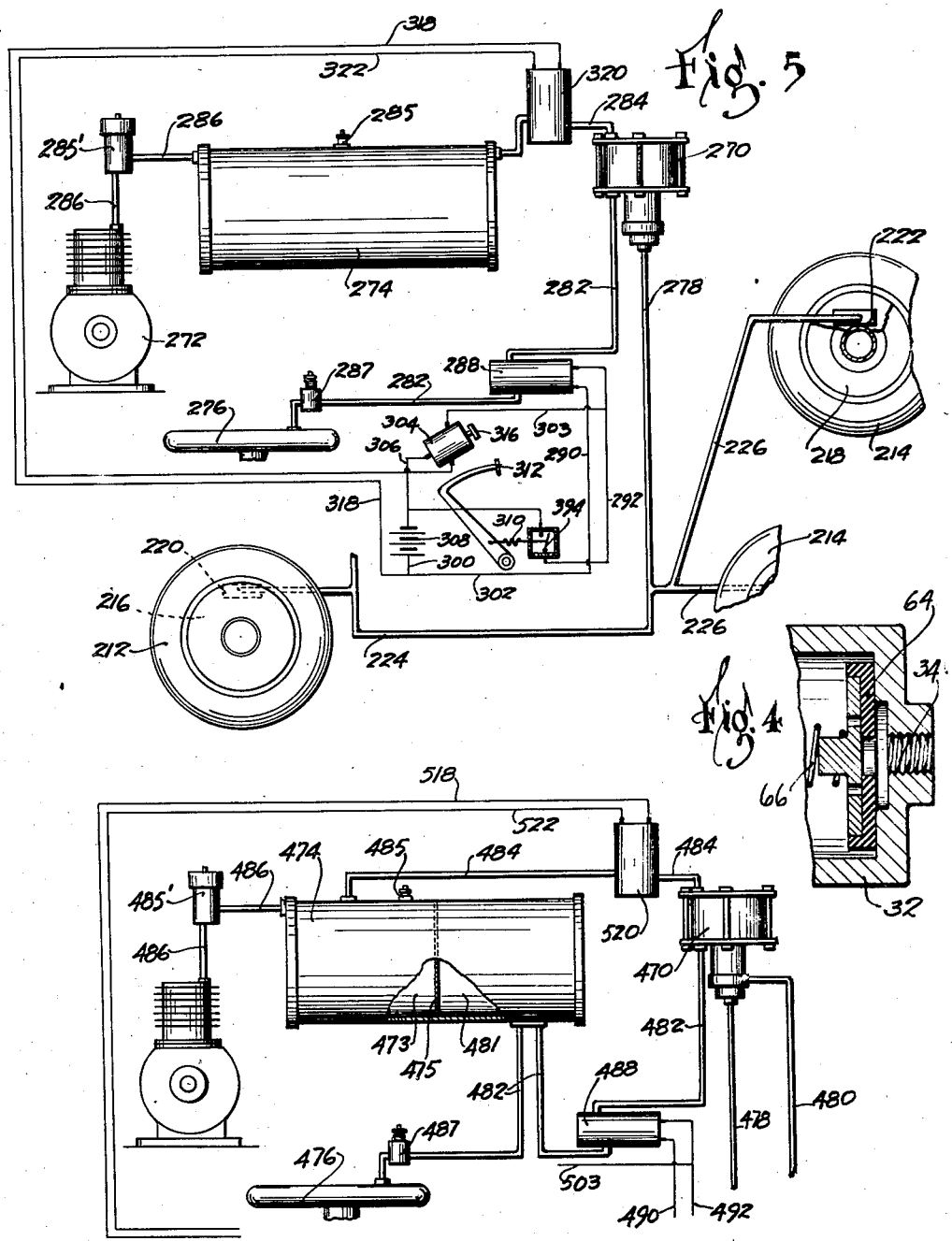

Patented Oct. 20, 1936

2,057,707

UNITED STATES PATENT OFFICE 2,057,707

BRAKE

Eugene G. Carroll, South Bend, Ind., assignor to Bendix Aviation Corporation, South Bend, Ind., a corporation of Delaware Application May 23, 1932, Serial No. 613,104

10 Claims. (Cl. 188—152)

This application relates to braking systems and is illustrated as applied to a hydraulic brake system.

In some respects the invention disclosed herein is similar to the invention disclosed in the copending application of Roy S. Sanford and Eugene G. Carroll, Serial No. 609,716, but in many respects differs therefrom.

One of the objects of this invention is to provide additional safety means to guard against loss of the brakes which might occur in the event of the breaking of a spring or in the event of the failure of the vacuum.

A further object of the invention is the combination vacuum power operation and compressed air power operation for brakes.

A further object of the invention is the combination of an air pressure system and a hydraulic pressure system for operating brakes.

One of the features of the invention is a master cylinder equipped with a hydraulic power multiplying device and combined with means for supplying additional quantities of liquid and for supplying additional power for applying the shoes of the brakes to the drums thereof.

Further objects and features of the invention will be apparent after a reading of the subjoined specification and claims and after a consideration of the accompanying drawings in which:

Figure 2 is a view of the combined liquid reservoir, vacuum booster, and compressed air booster shown in Figure 1;

Figure 3 is a view in section of a master cylinder shown in Figure 1;

Figure 4 is a sectional view showing the valve 64 of Figure 3 on a larger scale; and Figures 5 and 6 are views corresponding generally to Figure 1 showing modified arrangements.

Figure 1:
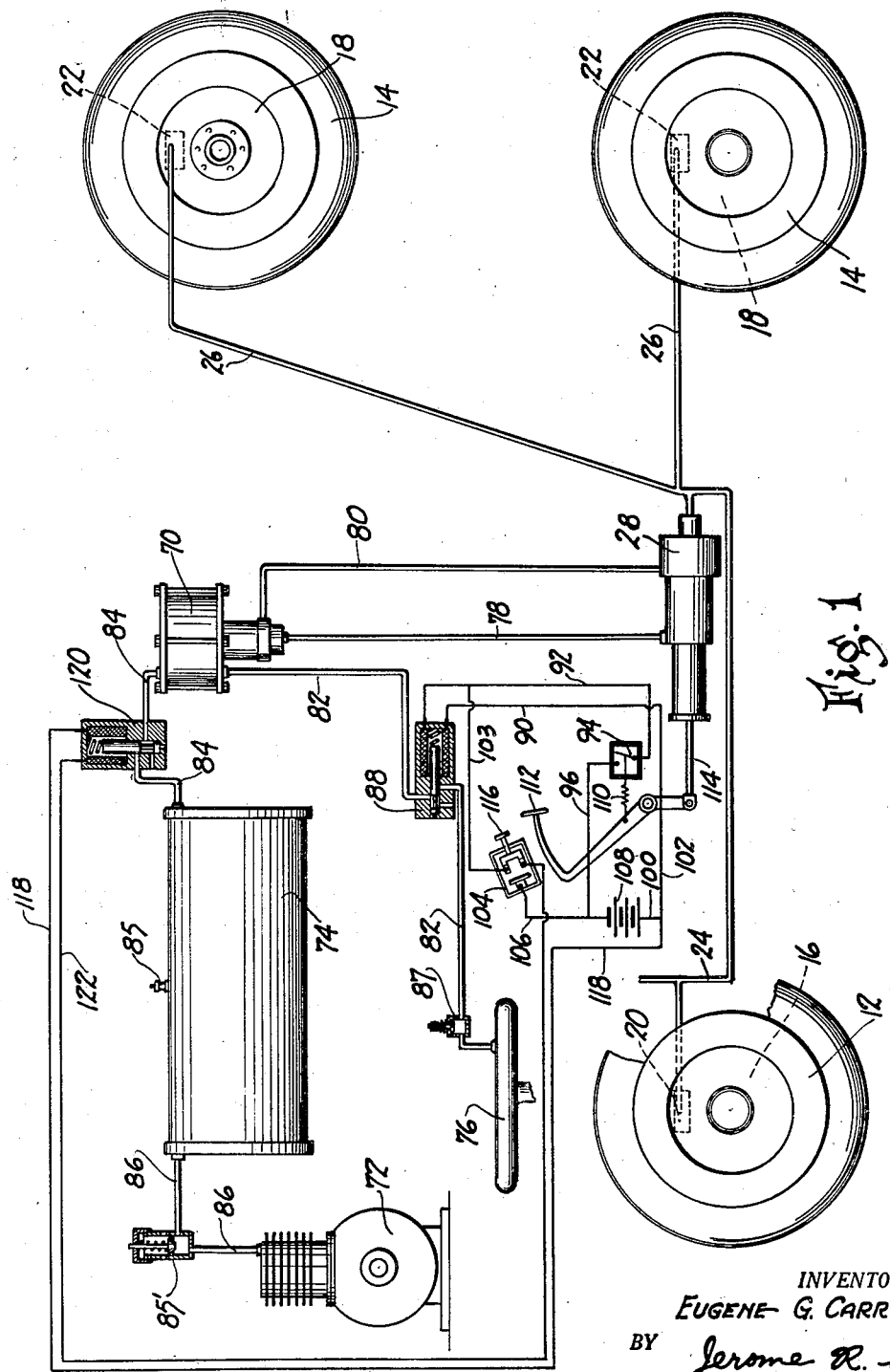
Figure 1 is a diagrammatic view illustrating an automobile equipped with a braking system constructed according to my invention.

Referring in detail to the drawings, I have illustrated in Figure 1 an automobile provided with front wheels such as 12, with rear wheels such as 14, with brakes for said wheels such as 16 and 18, and with means for operating the brakes. The means for operating the brakes include wheel cylinders 20 and 22, conduits 24 and 26, and a master cylinder 28.

The master cylinder 28 is shown more clearly in Figure 3 and comprises casting 30 and 32, the latter being formed with an opening 34 connected with the conduits 24 and 26. The casting 30 is formed with openings 36 and 38 for purposes later to be more fully described. Secured in the cylinder between the casting 30 and 32 is an annular head 39 provided with an annular packing cup 40 for cooperating with the front end of a plunger 42. Rearwardly thereof the casting 30 is formed with a flange 44 provided with an annular cup packing 46 which cooperates with a plunger 48.

The plunger 42 is positioned centrally of the cylinder and is formed at its forward end with a circular cross section adapted to fit loosely within the head 39 and tightly within the cup 40. At its rearward end it is formed with a head or piston 50 which is also of circular cross section but which has a larger diameter than the plunger 42 so that it fits within the bore of the casting 30. Associated with the head 50 is an annular cup packing 52 which faces rearwardly of the cylinder. The plunger 42 is formed rearwardly of the head 50 with a central projecting stem 54 adapted in the normal position of the parts of the cylinder to contact with the piston 48. The plunger 48 has a circular cross section fitting within the flange 44 and within the packing 46.

Adjacent the forward end of the plunger 42, the walls thereof are formed with one or more ports such as 56 through which liquid may flow to the portions of the system ahead of said plunger to compensate for expansion and contraction of the liquid due to temperature changes. Similarly the piston 48 adjacent to its forward end is formed with one or more ports such as 58. The rear end of the piston 48 is provided with a pair of reversed sealing cups 60 and 62 to prevent leakage of liquid from the cylinder and to prevent the entrance of air into the cylinder. The front end of the cylinder is provided with a two-way check valve 64 normally maintained upon its seat by a spring 66, the valve allowing substantially free forward movement of the liquid and the valve and spring cooperating to maintain a slight super-atmospheric pressure in the conduits 26 and 24 and in the wheel cylinders 20 and 22. The valve 64 is described in detail and claimed in my copending application Serial Number 602,328. A spring 68 is interposed between the cups 46 and 52 for maintaining the cups in their operative positions.

Means are provided for supplying liquid to the openings 36 in the master cylinder and different means are provided for supplying liquid to the opening 38 in the master cylinder. These means include (see Fig. 1) a booster 70, an air compressor 72, an air compression tank 74, the engine manifold 76, and conduits connecting these elements. The booster 70 is connected to the opening 38 by means of a conduit 78, and is connected to the opening 36 by means of a conduit 80. The booster is connected to the manifold 76 by means of a conduit 82 and with the compressed air tank 74 by means of a conduit 84. The compressed air tank is connected to the compressor by means of a conduit 86 and is also provided with an air receiving fitting 85 such as are usually used for filling automobile tires.

The manifold 76 is adapted to draw air from the booster 70 to force liquid into the master cylinder to apply the shoes to the brakes and to apply sufficient pressure to exert a small decelerating force upon the vehicle (e. g. deceleration of 5-7 ft. per second per second). The compressed air is adapted to force fluid to the master cylinder under sufficient pressure to accomplish any desired degree of braking. A pressure relief valve 85' is interposed in the conduit 86 and a suction relief valve 87 is interposed in the conduit 82. Electric means are provided for controlling the suction of air from the booster 70 by the manifold 76. Interposed in the conduit 82 is a solenoid controlled three-way valve 88, the solenoid being operated through either one of two electric circuits. The first of the circuits may include the electric wire 92 connected to the solenoid of valve 88, the switch 94, the wire 96, the battery 108, the wire 100, the wire 102, and the wire 90 connected to the opposite post of the solenoid. The second circuit includes the wire 92, the wire 103, the double contact switch 104, the wire 106, the battery 108, the wire 100, the wire 102, and the wire 90. The switch 94 is controlled through a spring 110 by a foot pedal 112 so that the initial movement of the pedal closes the switch. The pedal is mechanically connected through a piston rod 114 with the piston 48.

The switch 104 is controlled through a foot button 116 which is (like the pedal 112) positioned convenient for operation by the driver of the vehicle. The switch 104 also controls an electric circuit formed by the wire 106 connected to the switch, the battery 108, the wire 100, the wire 118, the solenoid of a solenoid controlled valve 120, and the wire 122 connected at one end to the solenoid and at the other end to the switch 104. The solenoid controlled three-way valve 120 is interposed in the conduit 84 and thus the button 116 is adapted not only to control the vacuum power operation of the booster but also the air pressure power operation thereof.

The booster 70 comprises a main casting 124, a lower cap casting 126 secured to said casting 124, a cylindrical can 128, and an upper cap casting 130. Slidably mounted in the booster 70 is a liquid plunger 132 to which there is secured an air piston 140. The air piston 140 acts (by reason of the suction of the vacuum beneath the piston and/or by reason of the pressure created above the piston by the air pressure system) to force the plunger 132 downward through the booster. The piston thus forces fluid to the master cylinder through the conduit 78 which is secured to the lower end of the cap 126. Air pressure is introduced through the conduit 84 which is secured in an opening in the cap member 130 and acts upon the liquid in the system to force the liquid through the conduit 80 which is secured to an opening in the side of the casting 124. The air pressure also acts on the piston 140 to aid in forcing the plunger 132 downward to force liquid out through the conduit 78. Secured within the casting 124 are a pair of annular heads 142 and 144. These heads are equipped with cup packings 146 and 148 respectively and together with the packings serve to seal the liquid and air systems to prevent the passage of either liquid or air upward past the heads.

As shown in Figure 5 I may dispense entirely with manual operation of the brakes. In Figure 5 the parts are designated by the same numerals as are corresponding parts shown in Figure 1 with the addition of 200 to each. Therein the booster 270 is utilized to perform the functions of a master cylinder. The conduit 278 leading from the booster is connected directly to the conduits 224 and 226. The entire hydraulic system is normally under atmospheric pressure by reason of the fact that the chamber in the cap of the booster 270 (corresponding to the cap 126 shown in Figure 2) is in communication with the interior of the plunger of the booster 270 (which corresponds to the plunger 132 shown in Figure 2) through ports (corresponding to the ports 150 and 152 of Figure 2) formed in said plunger and through grooves (corresponding to grooves 154 and 156 of Figure 2) formed in the head of the booster 270 (corresponding to the head 144 of Figure 2). As soon as the vacuum means or the compressed air means is actuated, the plunger of the booster 270 (corresponding to the plunger 132 of Figure 2) forces liquid to the brakes.

If the operator desires to apply braking force manually, he depresses the pedal 112. During the first portion of the movement this action closes the switch 94 and thus operates the solenoid controlled valve 88 to shut the opening therein leading to the atmosphere and to connect the manifold with the booster. This causes a withdrawal of air from beneath the piston 140, and atmospheric pressure within the conduit 84 and above the piston 140 forces that piston and the plunger 132 downward. This forces liquid through the conduit 78 into the master cylinder through the opening 38 and forces the piston 42 forward thus creating sufficient pressure in the lines to apply the shoes to the drums. If desired, the size of the piston in the booster 70 may be such that this result will be always just accomplished and the vacuum will not aid in the actual braking. However, I prefer to provide sufficient vacuum power to accomplish a deceleration of about 5 ft. per second per second. Further depression of the pedal 112 will act through the liquid trapped between the pistons 48 and 42 to develop higher pressures if they are needed. By reason of the differences in areas of the piston 48 and the head 50 of the plunger 42, the power transmitted from the pedal 112 through the piston rod 114 is multiplied by the hydraulic booster in its effect on the plunger 42. Nevertheless, the power developed is directly proportionate to the power exerted upon the pedal and therefore the brake is perfectly controllable.

The pressure acting on the liquid in the master cylinder between the annular head 39 and the piston 50 is normally the same as that in the hollow plunger 132 inasmuch as the two parts of the system are connected by the conduit 80. It is thus clear that any excess liquid in the master cylinder between the annular head 39 and the plunger 50 will back up into the reservoir formed by the hollow plunger 132 and will not interfere with the operation of the device.

When the valve 120 is opened, the pressure of the air from the tank 74 acts both on the liquid in the interior of the plunger 132 (the plunger reservoir) and on the piston 140. The area of the piston 140 is many times the area of the liquid acted on and the area of the plunger 132. Therefore, the pressure developed by said plunger on the liquid in cap 126, conduit 78 and in the space between the piston 48 and the piston 50 is many times greater than that between the piston 50 and the head 39. The force acting to move the piston 42 forward is the difference between the pressure developed in the liquid in the cap 126 by the action of the plunger 132 and that developed in the interior of the plunger 132 (the plunger reservoir) by the compressed air.

Should an emergency stop be necessary; should the operator feel that (even though the manual power required is relatively small due to the hydraulic booster) the manual power required to operate the brake entirely by the pedal 112 is more than he desires to exert; instead of operating the pedal 112 the operator touches the button 116. This not only operates the valve 88, but also operates the valve 120. Thus at the same time the air beneath the piston 140 is withdrawn and additional air under pressure is supplied to the booster above the piston 140. This forces a large quantity of fluid under relatively high pressure through the conduits 78 and 80 and thence through the conduits 24 and 26, and thus applies the brakes entirely by power with relatively high pressures.

In the arrangement shown in Figure 5 the master cylinder proper has been eliminated. therein the system may be operated through the pedal 312 or the button 316 in a manner similar to that outlined above. Operation of the pedal 312 closes the switch 394 and thus operates the solenoid controlled valve 288 which corresponds in all respects to the valve 88 to shut the opening therein leading to the atmosphere and to connect the manifold with the booster 270. This connection causes a withdrawal of air from beneath the piston in said booster corresponding to the piston 140 and atmospheric pressure forces that piston and the plunger associated therewith downward. The downward movement forces liquid through the conduit 278 and the conduits 224 and 226 to apply the shoes to the drums. The arrangement is preferably such as to provide sufficient power to accomplish a deceleration of about five feet per second per second. If further braking is required the operator touches the button 316. This operates the valve 320. Thus additional air under pressure is supplied to the booster 270 above the piston corresponding to the piston 140 and this forces a large quantity of fluid under relatively high pressure through the conduits 278, 224 and 226 and applies the brakes entirely by power with high pressures. When a high pressure stop is required, the operator need not depress the pedal 312 at all inasmuch as operation of the button 316 will operate the valve 288 as well as the valve 320 and thus the brakes may be applied entirely by power with relatively high pressure through the use of the button 316 alone.

Should it happen that the air pressure system and the vacuum system of the vehicle should both fail at the same time, nevertheless the brakes may be operated directly through the pedal 112. Under such circumstances the piston rod 114 acts through the piston 48 and the extension 54 to operate the plunger 42 just as if the rod 114 were directly connected to the plunger 42. In view of the fact that the plunger 42 is preferably of slightly larger area than the area of pistons usually used (the forward end of the plunger 42 and the forward end of the plunger 48 preferably having a diameter of 1½ inches), the pressure required for this emergency operation would be higher than that normally required in the operation of hydraulic brakes, but the pressure required would not be excessive nor objectionable in such unusual operations.

Due to the fact that an air pressure in the tank 74 of about 30 lbs. will be sufficient to provide adequate brakes, a very cheap compressor 72 may be used and even if desired the compressor 72 may be eliminated, the tank 74 being periodically recharged with compressed air at a tire filling station.

The use of compressed air eliminates the lag in the operation of the brakes which might at times be objectionable in a vacuum system if used alone.

As shown in Figure 6 I may enlarge the reservoir tank 474 and provide a partition 475. The tank is thus provided with an air pressure portion 483 to which is connected the conduits 484 and 486 and with a vacuum portion 481 which is interposed in the conduit 482 between the valves 487 and 488. In this figure all other parts corresponding to parts of Figure 1 are designated by the same numerals with the addition of 400.

It is to be understood that the above described embodiment of my invention is for the purpose of illustration only, and various changes may be made therein without departing from the spirit and scope of the invention.

I claim:

1. In a braking system for actuating wheel brakes, a master cylinder, means for forcing fluid from said cylinder for actuating said brakes comprising a forward piston positioned in said cylinder axially thereof, a rearward piston positioned in said cylinder axially thereof disconnected from said forward piston, and power means for forcing fluid to said cylinder.

2. In a braking system, a master cylinder, a forward piston positioned therein, a rearward piston positioned therein, said pistons contacting with each other in their normal inoperative positions, and being at times spaced from each other whereby at such times force acting upon said rearward piston in a forward direction is transmitted through interposed fluid to the forward piston, and power means for supplying fluid to said cylinder for moving said forward piston out of contact with said rearward piston.

3. In a braking system, a master cylinder, a forward piston positioned therein, a rearward piston positioned therein at times spaced from said forward piston, means for trapping fluid between said two pistons, whereby at such times force acting on said rearward piston in a forward direction is transmitted through the fluid to the forward piston, and power means for forcing fluid into said cylinder.

4. In a braking system, a master cylinder, a forward piston positioned therein, a rearward piston positioned therein at times spaced from said forward piston, means for trapping fluid between said two pistons, whereby at such times force acting on said rearward piston in a forward direction is transmitted through the fluid to the forward piston and pneumatically operated power means for operating one of said pistons.

5. In a braking system, a master cylinder, a forward piston positioned therein, a rearward piston positioned therein at times spaced from said forward piston, means for trapping fluid between said two pistons, whereby at such times force acting on said rearward piston in a forward direction is transmitted through the fluid to the forward piston, and vacuum operated power means for forcing fluid into said cylinder.

6. In a braking system, a master cylinder, a forward piston positioned therein, a rearward piston positioned therein at times spaced from said forward piston, means for trapping fluid between said two pistons, whereby at such times force acting on said rearward piston in a forward direction is transmitted through the fluid to the forward piston, and power means operated by air under superatmospheric pressure for forcing fluid into said cylinder.

7. In a braking system, a master cylinder, a forward piston positioned therein, a rearward piston positioned therein having a diameter substantially equal to that of the forward piston, and power means for displacing fluid in said cylinder.

8. In a fluid braking system, a container for liquid, vacuum operated power means for applying a limited amount of pressure to said liquid, and additional power means for applying separately and successively a greater pressure to said liquid.

9. In a fluid braking system, a container for liquid, power means for applying a limited amount of pressure to said liquid, additional power means for applying a greater pressure to said liquid, electrically controlled means for actuating said first named power means only, and additional electrically controlled means capable of actuating both of said power means.

10. In a fluid transmitting system, a master cylinder having an opening adjacent to the forward end thereof, an opening in the side intermediate its ends, and an opening in the side adjacent to the rear thereof; sealing means for preventing fluid entering through said rear opening from passing rearwardly therefrom; a rear annular head positioned just in advance of said rear opening; sealing means associated with said head for at times preventing passage of fluid rearwardly thereby but always allowing substantially free forward passage of fluid; a forward annular head positioned intermediate between said intermediate opening and said forward opening; sealing means associated with said last named head for at times preventing passage of fluid rearwardly thereby but always allowing substantially free forward passage of fluid; a forward plunger having a relatively small forward piston passing through said forward head, fitting in the opening therein, formed with a port to allow passage of fluid normally past said forward head in both directions and having a relatively large rearward piston positioned to move between said rear head and said intermediate opening; a sealing means associated with said rearward piston for preventing passage of fluid forwardly thereby; a rear plunger having a relatively small diameter, passing through said rearward head, fitting in the opening therein, and formed with a port to allow passage of fluid normally past said rearward head in both directions; means for supplying fluid under atmospheric pressure to said intermediate opening; and means for supplying fluid under superatmospheric pressure to said rearward opening.

EUGENE G. CARROLL.